(12) United States Patent
Stellwag et al.

(10) Patent No.: US 6,898,259 B2
(45) Date of Patent: May 24, 2005

(54) PROCESS FOR REDUCING THE CORROSION OF A COMPONENT OF A NUCLEAR FACILITY, AND COMPONENT OF A NUCLEAR FACILITY

(75) Inventors: Bernhard Stellwag, Nürnberg (DE); Patricia Vaz, Nürnberg (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 10/252,320

(22) Filed: Sep. 23, 2002

(65) Prior Publication Data

US 2005/0069078 A1 Mar. 31, 2005

Related U.S. Application Data

(63) Continuation of application No. PCT/DE01/00898, filed on Mar. 8, 2001.

(30) Foreign Application Priority Data

Mar. 21, 2000 (DE) .......................................... 100 13 865

(51) Int. Cl.$^7$ ................................................. G21C 9/00
(52) U.S. Cl. ........................ 376/305; 376/306; 376/414
(58) Field of Search ................................ 376/305, 306, 376/414

(56) References Cited

U.S. PATENT DOCUMENTS

| | | | | |
|---|---|---|---|---|
| 4,297,246 A | * | 10/1981 | Cairns et al. | ............... 502/304 |
| 5,135,709 A | | 8/1992 | Andresen et al. | |
| 5,182,077 A | * | 1/1993 | Feinroth | ..................... 376/416 |
| 5,205,864 A | * | 4/1993 | Snyder | .................. 106/287.26 |
| 5,768,330 A | * | 6/1998 | Andresen et al. | ........... 376/305 |
| 5,774,516 A | | 6/1998 | Hettiarachchi et al. | |
| 5,849,110 A | * | 12/1998 | Blohowiak et al. | ......... 148/247 |
| 5,904,991 A | * | 5/1999 | Hettiarachchi | ........... 428/472.1 |

FOREIGN PATENT DOCUMENTS

| | | |
|---|---|---|
| DE | 293 340 A5 | 8/1991 |
| DE | 44 01 671 A1 | 7/1995 |
| DE | 197 21 080 C1 | 10/1998 |
| EP | 0 826 789 A1 | 3/1998 |
| EP | 0 986 069 A1 | 3/2000 |
| ES | 2 063 696 | 1/1995 |
| JP | 03 104 885 A | 5/1991 |
| WO | 96/20132 | 7/1996 |
| WO | WO99/17302 | 4/1999 |

OTHER PUBLICATIONS

Schwartz, et al., "Densification and Crystallization of Zirconia Thin Films Prepared by Sol–Gel Processing," Ceramic Transactions (1994), 43 (Ferroic Materials: Design, Preparation and Characteristics), pp. 145–163.*

(Continued)

*Primary Examiner*—Michael J. Carone
*Assistant Examiner*—Rick Palabrica
(74) *Attorney, Agent, or Firm*—Laurence A. Greenberg; Werner H. Stemer; Ralph E. Locher

(57) ABSTRACT

The corrosion of a component in a water-guiding loop of a nuclear facility is reduced. A protective layer is produced with a sol-gel process. Prior to the sol application, water that wettens the component is removed from the conduction system and the component is optionally dried in a separate step. After the sol-gel process has been carried out, the conduction system is again filled with water. A liquid sol film that is produced on the component is dried, especially by means of hot air. A component in the primary system of a boiling water reactor can especially be coated with a highly corrosion-resistant zirconium oxide protective layer according to the sol-gel process.

25 Claims, 4 Drawing Sheets

OTHER PUBLICATIONS

Barrow, D.: "Applications of Sol Gel Ceramic Coatings", Trans Tech Publications, 1996, vols. 122–124, pp. 443–450.

Atik, M. et al.: "Corrosion Resistant $ZrO_2$ Sol–Gel Coating On Stainless Steel", Materials Research Society, 1992, vol. 271, pp. 471–476.

de Lima Neto, P. et al.: "Sol–Gel $ZrO_2$ Coatings For Chemical Protection Of Stainless Steel", Journal of Sol–Gel Sciences and Technology, 1994, No. 2, pp. 177–184.

Sawochka, S.G. et al.: "Experience With Inhibitor Injection For IGSCC Inhibition In PWR Steam Generators", Proceedings Of The International Conference, Chemistry In Water Reactors: Operating Experience And New Developments, vol. 2, Apr. 1994, pp. 659–666.

Kurt H. Stern (ed.): "Metallurgical and Ceramic Protective Coatings", *Chapman & Hall, London*, 1996, pp. 112–115, 148–151.

* cited by examiner

PROCESS FOR REDUCING THE CORROSION OF A COMPONENT OF A NUCLEAR FACILITY, AND COMPONENT OF A NUCLEAR FACILITY

CROSS-REFERENCE TO RELATED APPLICATION

This application is a continuation of copending International Application No. PCT/DE01/00898, filed Mar. 8, 2001, which designated the United States and was not published in English.

BACKGROUND OF THE INVENTION

Field of the Invention

The invention lies in the field of nuclear engineering and relates, more specifically, to a process for reducing the corrosion, in particular for reducing the stress-corrosion cracking, of a component in a water-carrying system of lines in a nuclear facility, or nuclear engineering plant, in particular of a component in the primary circuit of a boiling water reactor.

In addition, the invention relates to a component of a nuclear facility, in particular in the primary circuit of a boiling water reactor.

It is known to increase the corrosion resistance of stainless steel by means of a zirconium oxide coating ($ZrO_2$) applied using the sol-gel process from the technical articles by C. Chino et al., "$ZrO_2$ Coatings on Stainless Steel by the Sol-Gel Process", Eur.Mater.Res.Soc.Monogr., 1992 (EUROGEL '91), pp. 327–33, and by M. Atik, "Corrosion Resistant $ZrO_2$ Sol-Gel Coating on Stainless Steel", Mater. Res. Soc. Symp. Proc., 1992, pp. 471–76, in "Better Ceramics through Chemistry V", Material Research Society Symposium Proceedings, V1. 271, Pittsburgh, Pa.

A technical article by Pedro de Lima Neto et al. "Sol-Gel $ZrO_2$ Coatings for Chemical Protection of Stainless Steel", 6181 Journal of Sol-Gel Science and Technology, 1994, pp. 177–84, describes the application of zirconium oxide coatings with zirconium propoxide ($Zr(OC_3H_7)_4$) as precursor and with isopropanol, acetic acid, and water as solvents.

The avoidance of corrosion has become one of the most important objectives of water chemistry in nuclear power plants, since such phenomena may have a considerable effect on the safety, reliability and efficiency of nuclear reactors. Various water-chemistry procedures have been developed in reactors in order to avoid corrosion. Depending on the pH in the primary water, a distinction is drawn in particular between the alkaline procedure, using alkalizing agents, the neutral procedure wherein oxidizing agents are added, the combined procedure and the complexone procedure. Reducing the corrosion in a nuclear reactor places extremely high demands on the person skilled in the art, since a very high temperature, a very high pressure and, in addition, a very high level of gamma and neutron radiation are present in the primary water, and in particular the gamma and neutron radiation make the corrosion processes proceed differently than in the field outside nuclear facilitys. On the other hand, in the case of a measure aimed at reducing corrosion in a nuclear reactor, it is also necessary to ensure that chemicals which are introduced into the reactor water do not cause the formation of any deposits which increase the radioactivity in the primary circuit. There must also be no deposits which would reduce the heat transfer—for example in a steam generator—and would thereby reduce the efficiency of the nuclear reactor.

In nuclear power plants, oxidizing agents, in particular oxygen, which have an adverse effect on the corrosion, in particular the stress-corrosion cracking, of the components in water-carrying systems of lines, may form as a result of radiation-induced phenomena in the reactor water. One possible countermeasure using pressurized water reactors is to add reducing agents, in particular hydrogen. For boiling water reactors, it is known, for example from U.S. Pat. No. 5,135,709 and European patent EP 0 514 089 B1, to introduce catalyst material into the primary circuit or into the reactor water, in order to be able to break down the harmful oxidizing agents without having to add reducing agent or with only a small amount of reducing agent having to be added.

Another procedure consists in the component which is to be protected being covered at its surface with a protective layer which inhibits the diffusion of oxygen to the metallic component surface. By way of example, it is known from DE 197 21 080 C1 to apply a corrosion-inhibiting foreign oxide layer to the component. An electrically insulating covering of this type on the surface of metal components shifts the corrosion potential in the negative direction and therefore reduces the corrosion, in particular stress-corrosion cracking. For this purpose, hydrogen does not necessarily have to be added and catalyst material does not necessarily have to be present.

It is known from U.S. Pat. No. 5,774,516 and European published patent application EP 0 826 789 A1 to incorporate metals, in particular base metals, such as zirconium, titanium, nickel, hafnium and others, in an oxide layer which is present or formed on the metallic component surface. To dope the oxide layer, metal compounds are dissolved in water, in particular in the reactor water, from which they are incorporated in the oxide film, which is present or is formed separately.

The doping of an oxide layer which is present or the application of an oxide layer in combination with subsequent doping thereof does not always lead to satisfactory corrosion-reducing results.

SUMMARY OF THE INVENTION

It is accordingly an object of the invention to provide a method of reducing the corrosion of a water-carrying component in a nuclear facility and a component for a nuclear facility which overcome the above-mentioned disadvantages of the heretofore-known devices and methods of this general type and which enables the application of a protective layer to the component in a simple way, and wherein the protective layer that is formed has a considerable and substantial corrosion-reducing effect on the component. It is a further object to provide a component of a nuclear facility which has been coated with a protective layer which has a particularly strong corrosion-inhibiting action.

With the foregoing and other objects in view there is provided, in accordance with the invention, a method of reducing a corrosion susceptibility of a component of a water-carrying system of lines in a nuclear facility, such as a water-carrying component in a primary circuit of a boiling water reactor. The method comprises forming a protective layer on the component with a sol-gel process.

In other words, the objects relating to the process, based on the process described in the introduction, is achieved in that a protective layer is produced on the component using a sol-gel process. With the process, it is possible in particular to reduce the intercrystalline stress-corrosion cracking in the nuclear facility. The stress-corrosion cracking may, for example, be radiation-induced.

The invention is based on the novel discovery that a protective layer produced using the sol-gel process can be used in the field of nuclear engineering, where it withstands in particular the high demands relating to stability under the action of radioactive radiation and, at the same time, under a high pressure and at high temperatures in water of several hundred ° C., if appropriate in combination with substantial mechanical vibrations. The sol-gel process has not hitherto been considered by the specialist world for nuclear engineering applications, in particular for the treatment of steel primary circuit components.

Moreover, the invention makes use of the discovery that, with a protective layer produced using the sol-gel process, a component of a nuclear facility can be protected against corrosion in a particularly reliable and efficient way and therefore particularly advantageously.

A further advantage of the process is that a native oxide layer which is already present on the component can be left on the component. The protective layer applied in accordance with the process can be applied to this native oxide layer. The native oxide layer may have been formed, for example, during reactor operation.

According to a preferred configuration, before the sol-gel process is applied, water which wets the component is removed from the system of lines, and, after the sol-gel process has been applied, the system of lines is filled again with water. By way of example, the sol-gel process is carried out when the reactor is shut down.

After the removal of the water that wets the component, the component is in particular dried. This means that in a separate drying step, after the water has been drained or pumped out, any residual water that remains on the component is removed, specifically before the sol is applied or introduced. The result of this is that there are no water residues that affect the quality of the protective layer remaining even when a sol which is water-sensitive is used.

It is preferable for a sol-gel process to be used to produce a further protective layer on the protective layer which has been produced. In this case, the two protective layers produced may have different chemical compositions.

To produce the protective layer, in particular first of all a liquid sol film is applied to the component, and the sol film is then dried.

The sol can be produced, for example, by converting a precursor for the protective layer which is to be formed into the sol state using a suitable solvent, in particular an alcohol, and optionally water. The gel state can then be produced by extracting water from the sol during drying. During further drying, gel particles which are formed can sinter together.

The sol-gel process can be used to produce particularly fine-grained matrix microstructures with a very narrow distribution of the grain sizes. The protective layer has particularly small particle sizes, typically in the range from 5 nm to 50 nm. In other words, it is possible to produce on the component a protective layer which is highly compacted and therefore has a particularly good sealing and corrosion-reducing effect.

The sol film is preferably sprayed or spread on. This has the advantage that a particularly small amount of sol is required in order to form the protective layer.

According to a particularly preferred configuration, the sol film is applied by introducing a sol into an interior of the system of lines, from which the water has been removed, and bringing it into contact with the component, and then draining or pumping the sol out of the interior, so that the sol film remains on the component. This results in the particular advantage that—in particular in the case of a relatively long time of action—all the components in a defined section of the system of lines which is to be protected against corrosion can be covered with a protective layer in one step. This applies in particular to relatively inaccessible areas in the system of lines.

The component is, for example, a pipe, a pipeline section, a valve, a pump, a vessel or a component in a vessel or pipe of this type. By way of example, the process is carried out in order to coat the inner surface of the reactor pressure vessel. The sol film can in this case be applied, for example, to the inner surface as a result of a manipulator mast with a spray device at the end being introduced into the interior of the reactor pressure vessel after the cooling water has been drained and the sol being sprayed from this device onto the inner surface. Alternatively, the interior of the reactor pressure vessel may be filled with the sol after the cooling water has been drained. In this case, one or more displacement bodies, e.g. an air-filled rubber balloon, may be used in order to reduce the amount of sol which is required in order to wet the inner surface of the reactor pressure vessel.

The sol is preferably drained or pumped out of the interior in such a manner that the sol level in the interior falls at a rate, in particular a constant rate, in the range from 0.5 cm/min to 100 cm/min, particularly preferably in the range from 30 cm/min to 60 cm/min. In this way, it is possible to produce a particularly homogeneous protective layer. Moreover, in this way it is possible to produce a particularly thin protective layer.

In particular, a protective layer with a thickness of less than 1 $\mu$m is produced. The thickness is, for example, more than 50 nm or more than 100 nm.

According to a very particularly preferred configuration, the drying of the sol film is carried out at a temperature which is greater than the local room temperature and less than 350° C., in particular less than 250° C. In this context, the invention is based on the further fundamental discovery that even with such a low thermal after treatment temperature, it is possible to produce a strongly corrosion-resistant protective layer using the sol-gel process. Hitherto, it had been assumed that considerably higher temperatures, at least more than 400° C., are required in order to carry out the sol-gel process. The low temperatures which are preferred in the method according to the invention have the advantage of making it easy to carry out the process on a large industrial scale, in particular with a low energy consumption.

Furthermore, a configuration of the process wherein hot air is blown onto the component in order to dry the sol film is particularly preferred. In this case, air, in particular hot air, is preferably circulated in the system of lines.

The protective layer may, for example, contain a silicon oxide, e.g. $SiO_2$.

According to another particularly preferred configuration, the protective layer is a foreign oxide layer which preferably contains an oxide of a metal from the fourth subgroup, the metal being, for example, zirconium or titanium. The protective layer contains in particular $ZrO_2$ or $TiO_2$. Such protective layers result in a high melting point, which is particularly advantageous for reactor operation, and also have a low solubility in water, which is likewise advantageous for nuclear engineering applications.

A sol which is particularly preferred for carrying out the sol-gel process is a solution of a metal alkoxide, preferably zirconium tetra-n-propoxide, in an alcohol, in particular n-propanol, with the optional addition of water and/or an organic acid, for example acetic acid. Therefore, the technical execution of the process can be made simple, and it is also possible to produce a protective layer which has particularly good corrosion-resistant properties.

The component which has been covered with a protective layer using the method according to the invention consists in particular of an unalloyed or low-alloy steel, a chromium steel, a chromium-nickel steel, in particular an austenitic chromium-nickel steel, a stainless steel or a nickel-base alloy, e.g. Alloy 600 or Alloy 182.

According to the invention, the object relating to the component is achieved, proceeding from the component of the type described in the introduction, by the fact that the component is covered with a protective layer which is applied using the sol-gel process.

The component has been covered with a protective layer in particular using the method according to the invention. The advantages which have been mentioned for the process apply in a similar way to the component.

In particular, the protective layer is a foreign oxide layer, which preferably contains an oxide of a metal from the fourth subgroup, the metal being, for example, zirconium or titanium.

The component preferably consists of stainless steel, in particular of austenitic chromium-nickel steel, or of a nickel-base alloy.

Other features which are considered as characteristic for the invention are set forth in the appended claims.

Although the invention is illustrated and described herein as embodied in a process for reducing the corrosion of a component in a nuclear facility, and a component in a water-carrying line system of a nuclear facility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
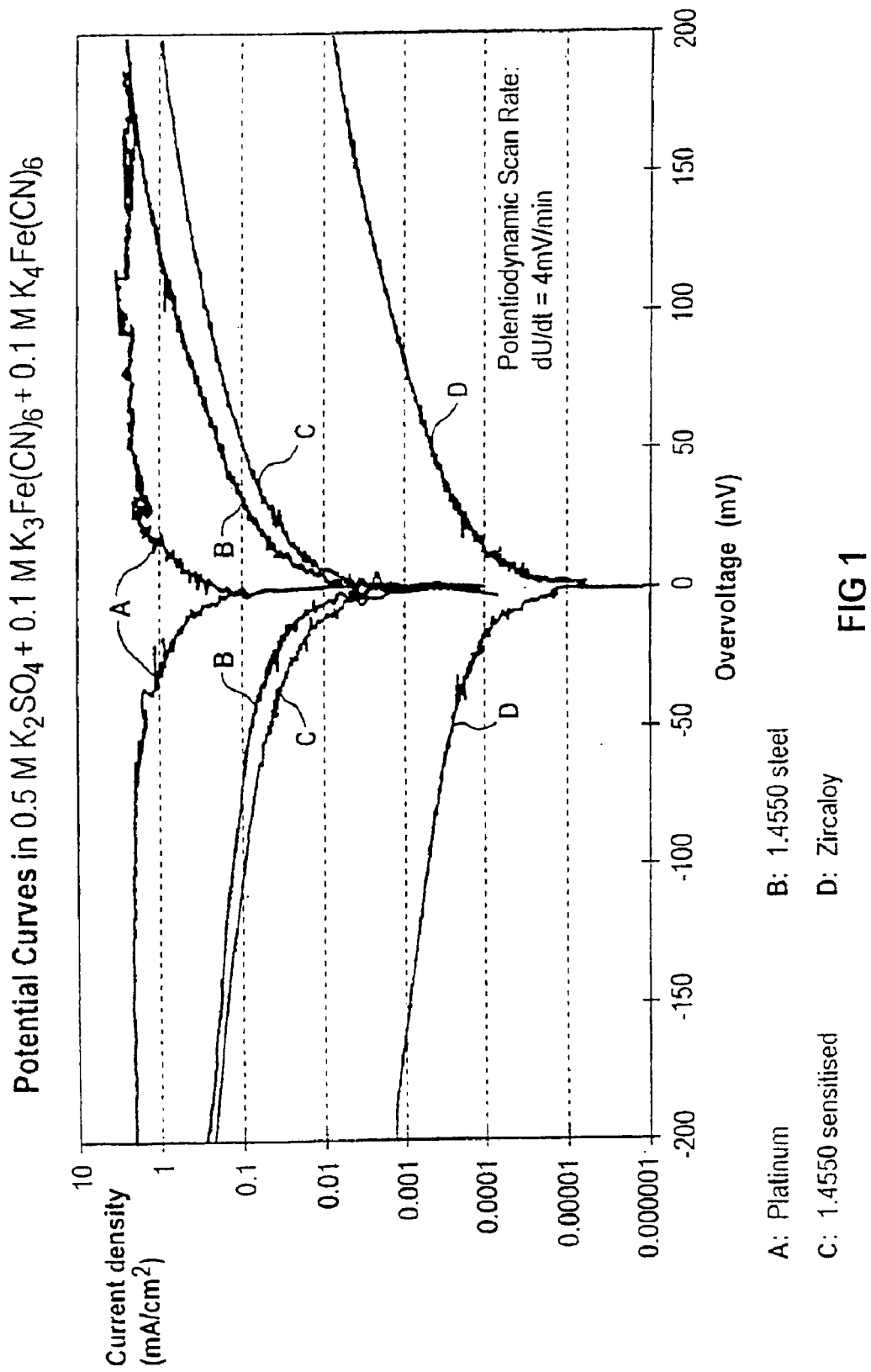
FIG. 1 is a graph plotting the results of reference measurements.

In a laboratory experiment, a sol was produced by converting an alkoxide precursor into the sol state by dissolving it in n-propanol and water. The synthesis took place at room temperature, under atmospheric pressure and at a pH of between 4 and 4.5, which was set by adding acetic acid. The sol concentration was between 0.2 mol and 0.5 mol.

The precursor, i.e. the "zirconium source" used was zirconium tetra-n-propoxide ($Zr(OC_3H_7)_4$). The acetic acid also serves as a condensation catalyst. It can also contribute to the complex formation. The water was added to the solution dropwise with stirring.

The sol can also be produced by using zirconium tetra-iso-propoxide as alkoxide precursor and dissolving it in isopropanol and water. The use of zirconium tetra-n-propoxide and n-propanol is preferred, since this results in a particularly high stability of the alkoxide precursor in the solution. This is because metal alkoxides are often water-sensitive, and in particular zirconium oxide has a low solubility in water. If water is added too quickly or too much water is added, the metal alkoxides or corresponding metal hydroxides are precipitated. These drawbacks are reduced— in particular for large-scale industrial application—if zirconium tetra-n-propoxide and n-propanol are used.

In the laboratory experiment, various stainless-steel components as specimens (20 mm×10 mm×3 mm) were introduced into a vessel which had been filled with the sol.

The components that were used consisted of sensitized austenitic chromium-nickel steel with the steel number 1.4550 of the following exemplary composition, in % by weight:

Fe 69.05%, C 0.075%, Si 0.52%, Mn 1.17%, P 0.027%, S 0.024%, Cr 17.85%, Ni 10.50%, Nb 0.78%.

A steel of this type is intended for use in the system of lines of a nuclear power plant.

The components were used in preoxidized form, i.e., in a similar way to under standard reactor operating conditions, a thin, stable iron-nickel-chromium oxide layer (native oxide layer) was formed. This layer may form, for example, as a result of oxidation for 300 hours with an $O_2$ concentration of 8 ppm and at 280° C. In the nuclear power plant, an oxide layer of this type is formed during reactor operation on account of the high cooling-water temperature and the oxidizing agents which are formed during operation.

The components were wetted with the sol. The sol level in the bath was then lowered at a rate of 1 cm/min. The rate at which the sol level is reduced may also be 10 cm/min or more, in particular up to 100 cm/min. The higher the drainage rate, the thicker the liquid or sol film produced. A high drainage rate is preferred for large-scale industrial application in a nuclear power plant, since in this way maintenance time can be reduced.

After the sol bath has been drained out of the vessel into which the components were introduced, the sol film remaining on the components was dried. The drying of the sol film and the removal of its organic constituents during the drying are of crucial importance to the quality of the resulting zirconium oxide protective layer ($ZrO_2$). If heating is very slow and careful, the sol film can fully react uniformly and can release its reaction products homogeneously.

A number of variants were tried for the drying of the sol film. Of these, the following procedure has proven particularly advantageous:

a) Drying of the sol film on the component in the vessel after drainage of the sol over a period of at least 12 hours.

b) Followed by drying of the component for two hours at 60° C. in air (air recirculation furnace).

c) Further raising of the temperature in steps, in the following stages:

80° C. for two hours,
100° C. for two hours,
110° C. for 30 minutes,
120° C. for 30 minutes,
130° C. for 30 minutes,
140° C. for 30 minutes, 150° C. for 30 minutes,
160° C. for 30 minutes,
170° C. for 30 minutes,
180° C. for 30 minutes,
190° C. for 30 minutes,
200° C. for 30 minutes,
210° C. for 30 minutes,
220° C. for 24 hours.

The above-mentioned very slow and careful drying and heating treatment means that there is sufficient time for condensation reactions to take place in the film and for the organic solution constituents to be released. As a result, a high film quality is achieved, without any internal stresses and without the formation of cracks.

Overall, the drying and heating phase using the parameters described lasts approximately 48 hours. For large-scale industrial application in nuclear power plants, this phase can be reduced by approximately half.

In the case of heat treatment below 250° C., it may be the case that the zirconium in the film does not completely crystallize in the form of zirconium oxide ($ZrO_2$). It is possible that the zirconium oxide film may then still be partially amorphous and under certain circumstances may also still contain organic constituents. However, as measurements have shown, this does not play a significant role in terms of its protective quality.

The electrode properties of components which have been treated in the manner described or in a similar manner are very similar to those of zirconium alloys. To demonstrate this, the polarization of coated components in $Fe^{+2}/Fe^{+3}$ hexacyanoferrate solution was measured in a test method. The result of this measurement is shown in FIG. 2. Corresponding reference curves are shown in FIG. 1.

In the testing process, which is known per se, a charge transfer takes place from the solution to a specimen which is connected as an electrode. The specimen is either a coated component or a reference component. The charge transfer is significantly influenced by the electrical conduction properties of an oxide film which may have formed on the component and represents a measure of the quality of the coating.

Figure 2:
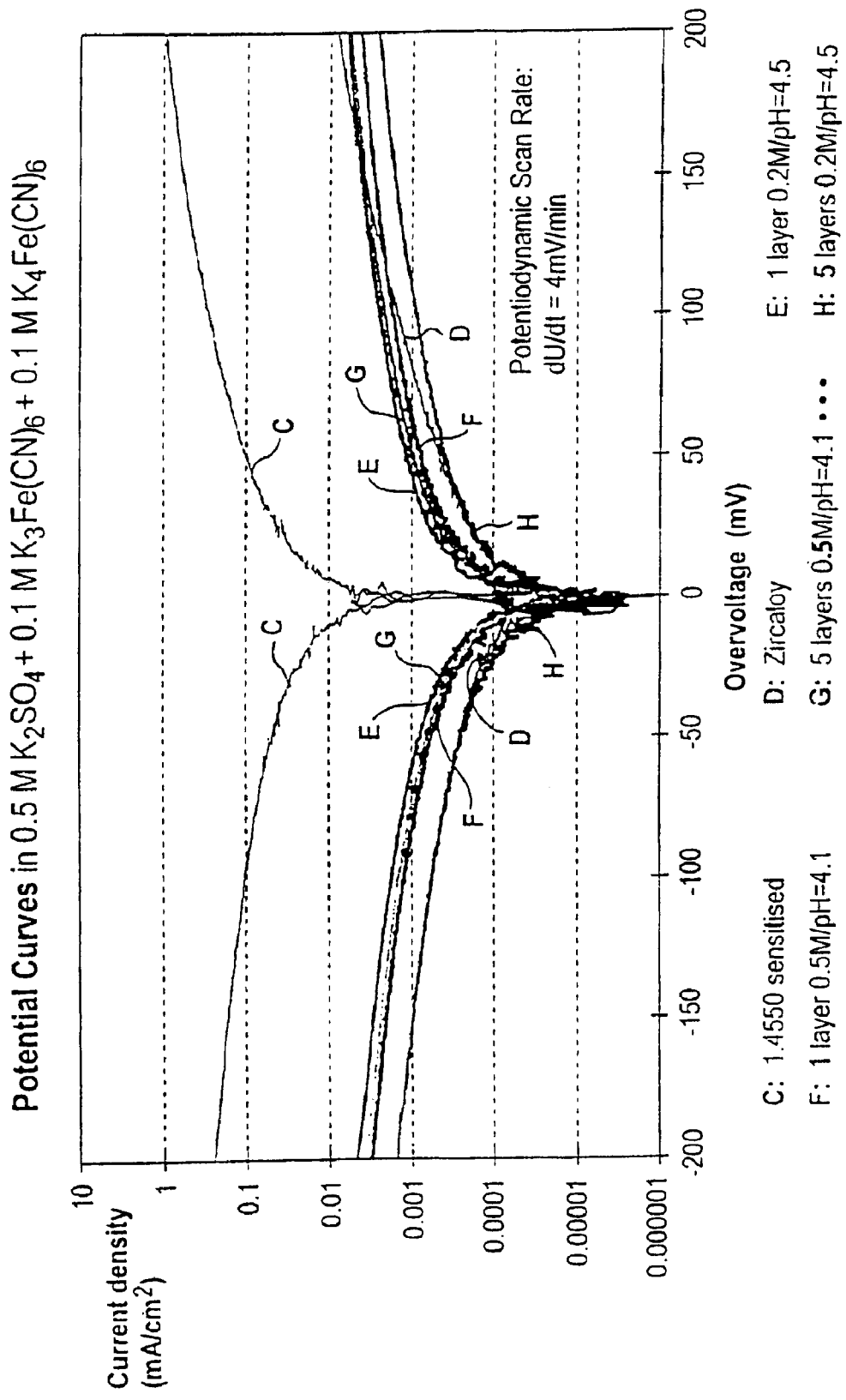
FIG. 2 is a graph plotting the results of measurements on protective layers which have been applied to various components using a sol-gel method according to the invention.

Referring now in this context to the figures of the drawing in detail and first, particularly, to FIG. 1 thereof, it can be seen from a first reference measurement A carried out on platinum that no oxide layer which impedes the charge transfer has been formed. It can be seen from the two further reference measurements B for chromium-nickel steel 1.4550 and C for sensitized chromium-nickel steel 1.4550 that semiconducting oxides are present on these uncoated steel specimens. In the case of a fourth reference measurement D illustrated in FIG. 1, which was carried out using a zirconium alloy (Zircaloy), there is a zirconium oxide film ($ZrO_2$) which is an insulator. The charge transfer from the solution to the electrode is almost completely suppressed.

The quality of the $ZrO_2$ protective layers which have been produced on steel using the method according to the invention is documented by means of the measurement curves plotted in FIG. 2. The reference curve C for sensitized chromium-nickel steel 1.4550 and the reference curve D for Zircaloy, which have already been shown in FIG. 1, are plotted again in this FIG. 2 to facilitate comparison.

Moreover, four further measurement curves E, F, G, H relating to component specimens on which a zirconium oxide protective layer has been produced using the above-mentioned sol-gel process are plotted in this figure. In detail, these measurements were carried out on the following component specimens:

E: single-layered protective layer (zirconium oxide coating), 0.2 molar coating solution with pH 4.5
F: single-layered protective layer (zirconium oxide coating), 0.5 molar coating solution with pH 4.1
G: five-layered protective layer (zirconium oxide coating), 0.5 molar coating solution with pH 4.1
H: five-layered protective layer (zirconium oxide coating), 0.2 molar coating solution with pH 4.5.

With reference to FIG. 2, the measurement curves E, F, G, H for zirconium oxide coatings on steel are very close to the reference curve D for a Zircaloy electrode. The measurement curve H corresponding to a five-layered coating and a 0.2 molar zirconium sol is even virtually congruent with the reference curve D for Zircaloy and is therefore difficult to actually differentiate therefrom in FIG. 2.

The measurements show that the thin zirconium oxide film formed—with an estimated thickness in the region of approximately 50 nm—protects the stainless-steel component specimens in the desired way.

The polarization resistance measurements showed that a high pH in the sol increases the quality of the protective layer produced. On the other hand, it is found that a very high thickness of the protective layer produced no longer significantly improves the corrosion resistance of a component compared to a lower layer thickness.

The sol-gel process which was tested on a laboratory scale can be carried out, for example, when a nuclear power plant installation, e.g. a light water reactor, is in the shut-down state, after the reactor coolant has been removed and the component surfaces have been dried.

Figure 3:
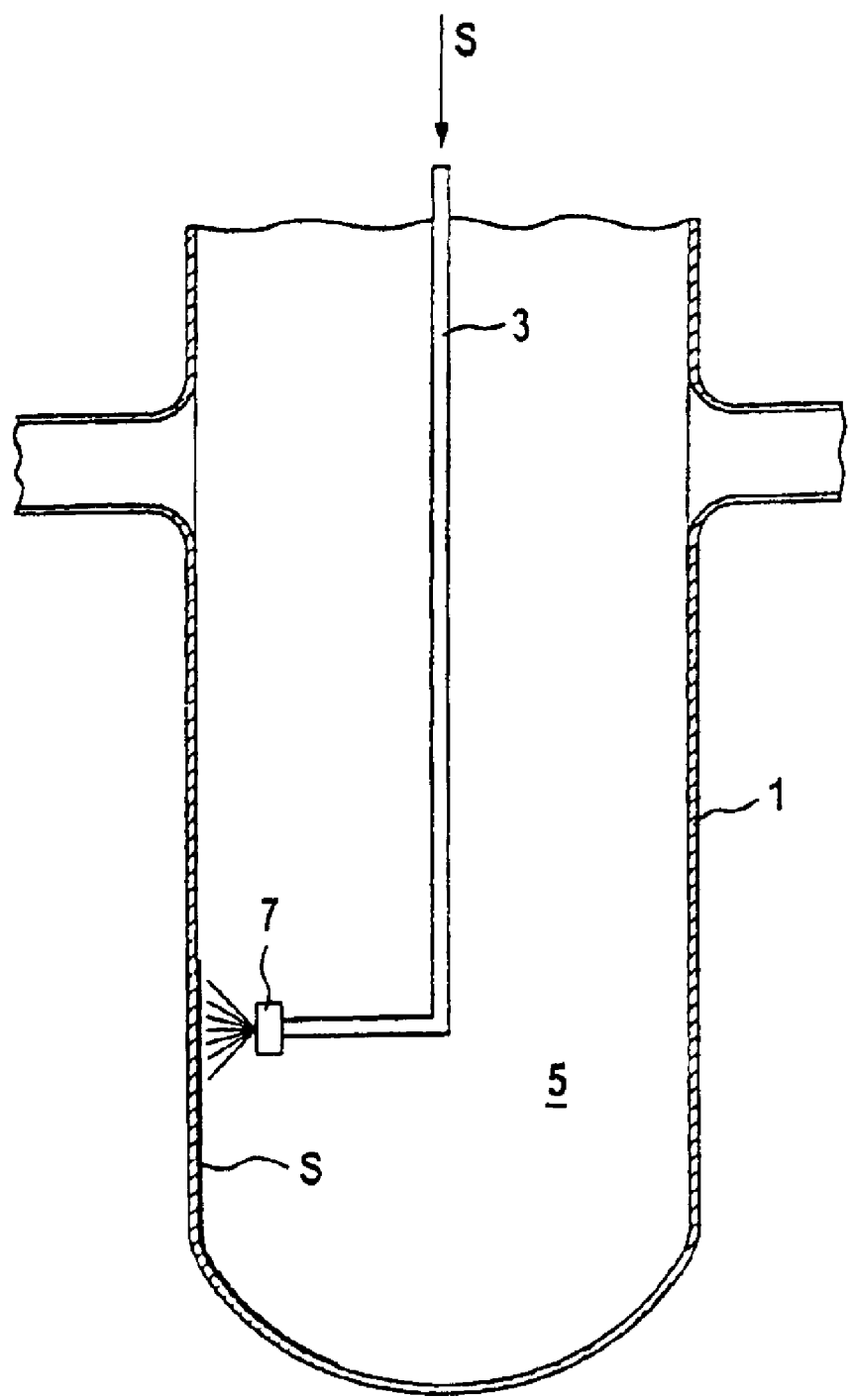
FIG. 3 is a diagrammatic side view of a first variant for applying a sol to a component of a nuclear facility.

The sol can then be applied, for example, to the inner surface of a reactor pressure vessel 1 by being sprayed on, as illustrated diagrammatically in FIG. 3. For this purpose, a manipulator mast 3 is introduced into the interior 5 from above and sol S is sprayed onto the inner surface from a spray head 7 which is secured to the end of this mast. To minimize the consumption of sol, excess sol which runs down the inner surface can be collected and returned to the spray head 7. After all the desired areas have been sprayed, the drying of the sol film applied begins, in particular as described above.

Figure 4:
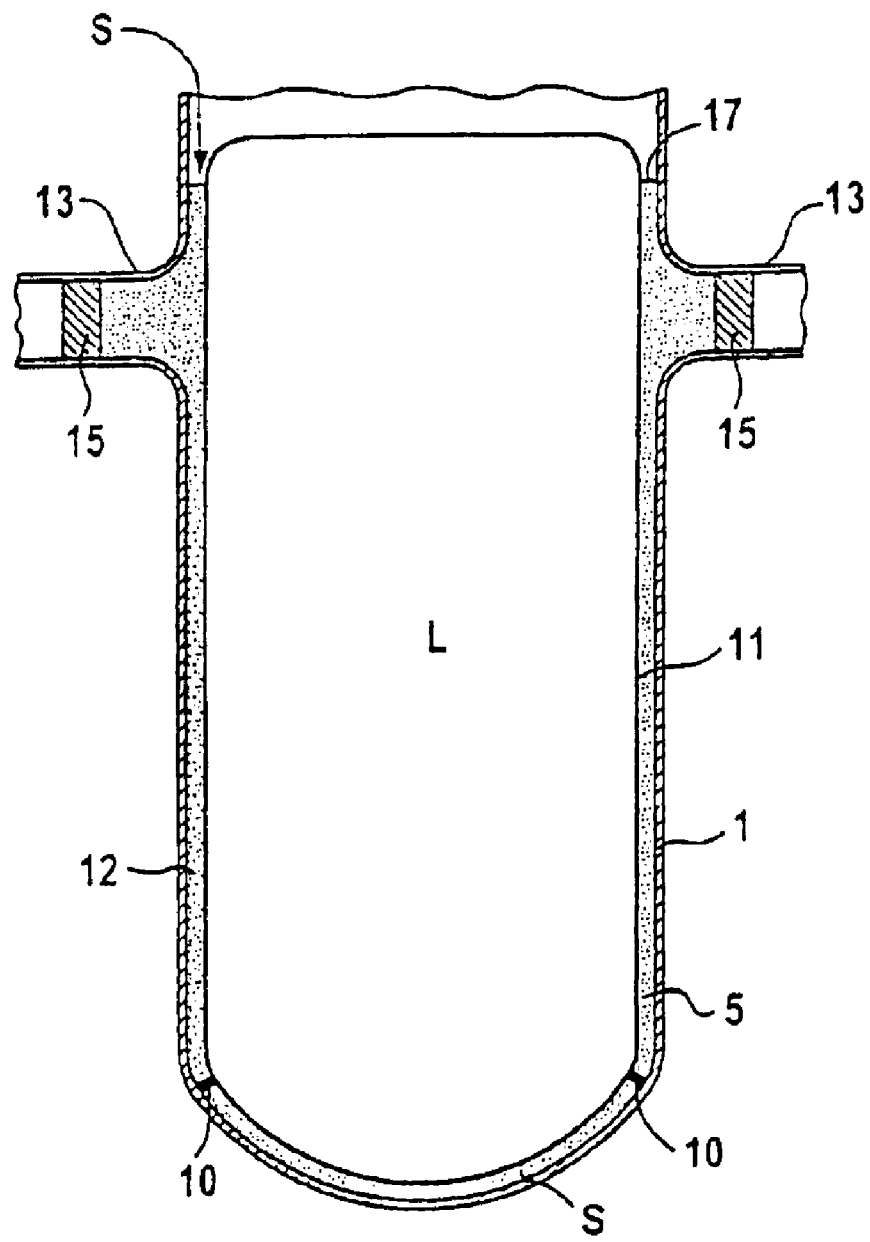
FIG. 4 is a diagrammatic sectional side view of a second variant for applying a sol to a component of a nuclear facility.

Another variant for application of the sol is sketched in FIG. 4. A displacement body 11 which is roughly matched to the inner contour of the reactor pressure vessel 1, is designed as a rubber balloon and is filled with air L, is introduced into the interior 5 of the reactor pressure vessel 1. To compensate for its buoyancy, it is fixed to the reactor pressure vessel 1 by means of fixing elements 10. The sol S is introduced into a space 12 between the displacement body 11 and the inner surface of the reactor pressure vessel 1 up to a level 17. The space 12 has a width of less than 0.5 m. Cooling circuit connection stubs 13 which are present are for this purpose each sealed by means of a closure element 15. After an action time of less than one hour, the sol S is drained out at a constant rate and the displacement body 11 is removed. The drying of the applied sol film then begins, in particular as described above.

After drying has been completed, the cooling water can be introduced back into the reactor pressure vessel 1 and reactor operation can resume.

In the examples shown in FIGS. 3 and 4, the reactor pressure vessel 1 as the component which is to be coated may also be produced from a ferritic fine-grain structural steel, e.g. 22NiMoCr 37. The component may be provided with an austenitic plating.

The component may also be produced from Ti-stabilized austenite 1.4541 (X6CrNiTi189) or from Nb-stabilized steel 1.4550 (X6CrNiNb189) or from unstabilized austenite (e.g. US grade A 304).

The discovery that the heat treatment or drying can be carried out at very low temperatures, e.g. even as low as 50° C. to 60° C., is of considerable importance for large-scale industrial implementation of the sol-gel process in the circuit system of a nuclear power plant. The process can even be carried out at temperatures of around 20° C. This even makes it possible to dispense with a drying furnace, wherein only relatively small components can be coated, whereas a pipeline system installed on site or, for example, a reactor pressure vessel cannot be coated therein. For cost-effective large-scale industrial implementation, the use of zirconium tetra-n-propoxide, which is significantly less expensive than zirconium tetra-iso-propoxide, also plays a role.

We claim:

1. A method of reducing a corrosion susceptibility of a water-carrying stainless-steel component in a primary circuit of a boiling water reactor, which comprises:

providing a water-carrying stainless-steel component in a primary circuit of a boiling water reactor in a nuclear facility; and forming a foreign oxide layer containing an oxide of a metal from the fourth subgroup of the periodic table of elements on the component by applying a liquid sol film to the component and subsequently drying the sol film at a drying temperature less than 350° C. to form a sol-gel.

2. The method according to claim 1, which comprises, prior to carrying out the sol-gel process, removing water wetting the component from a system of lines, and following the sol-gel process, refilling a system of lines with water.

3. The method according to claim 2, which further comprises drying the component prior to the sol-gel process.

4. The method according to claim 1, which further comprises:

forming the foreign oxide layer as a first sol-gel layer; and forming a second sol-gel layer on the first sol-gel layer, the second sol-gel layer containing an oxide of a metal from the fourth subgroup of the periodic table of elements on the component by applying a liquid sol film to the component and subsequently drying the sol film at a drying temperature less than 350° C. to form the sol-gel.

5. The method according to claim 1, wherein the applying step includes spraying the sol film on the component.

6. The method according to claim 1, wherein the applying step comprises introducing a sol into an interior of a system of lines, from which water has been removed, bringing the sol in contact with the component, and removing the sol from the interior, thus forming the sol film on the component.

7. The method according to claim 6, wherein the removing step comprises one of draining the sol and pumping the sol out of the interior.

8. The method according to claim 6, which comprises removing the sol from the interior such that a sol level in the interior falls at a rate between 0.5 cm/min and 100 cm/min.

9. The method according to claim 8, which comprises adjusting a removal rate to between 30 cm/min and 60 cm/min.

10. The method according to claim 6, which comprises removing the sol from the interior at a constant rate.

11. The method according to claim 1, wherein the drying step comprises drying the sol film at a temperature greater than ambient room temperature.

12. The method according to claim 11, which comprises setting a drying temperature to less than 250° C.

13. The method according to claim 1, wherein the drying step comprises increasing a temperature from a starting temperature to a final temperature.

14. The method according to claim 13, wherein the starting temperature is an ambient room temperature.

15. The method according to claim 13, wherein the final temperature is less than 300° C.

16. The method according to claim 13, wherein the final temperature is less than 250° C.

17. The method according to claim 13, wherein the step of drying the sol film comprises circulating air in a system of lines.

18. The method according to claim 1, wherein the foreign oxide layer contains a metal selected from the group consisting of zirconium and titanium.

19. The method according to claim 1, wherein the sol is a solution of a metal alkoxide in an alcohol, and water.

20. The method according to claim 1, wherein the metal alkoxide is zirconium tetra-n-propoxide ($Zr(OC_3H_7)_4$), the alcohol is n-propanol, and the optional component, if present, is acetic acid.

21. The method according to claim 1, which comprises applying the protective layer to a native oxide layer of the component.

22. The method according to claim 1, which comprises applying the protective layer to a native oxide layer of the component formed during reactor operation.

23. The method according to claim 1, wherein the component is formed of a material selected from the group consisting of unalloyed steel, low-alloy steel, chromium steel, chromium-nickel steel, and a nickel-based alloy.

24. The method according to claim 1, wherein the applying step includes spraying the sol film and spreading the sol film on the component.

25. The method according to claim 1, wherein the sol is a solution of a metal alkoxide in an alcohol, and a organic acid.

* * * * *